US011010156B1

(12) United States Patent
Zhao et al.

(10) Patent No.: US 11,010,156 B1
(45) Date of Patent: May 18, 2021

(54) METHODS AND SYSTEMS FOR GENERATING APPLICATION BUILD RECOMMENDATIONS

(71) Applicant: Shopify Inc., Ottawa (CA)

(72) Inventors: Jingchuan Zhao, Toronto (CA); Xinyi Zhao, Etobicoke (CA); Mladen Rangelov, Etobicoke (CA); Putra Manggala, Montreal (CA); Brandon Chu, Toronto (CA); Peng Yu, Montreal (CA)

(73) Assignee: Shopify Inc., Ottawa (CA)

( * ) Notice: Subject to any disclaimer, the term of this patent is extended or adjusted under 35 U.S.C. 154(b) by 39 days.

(21) Appl. No.: 16/679,449

(22) Filed: Nov. 11, 2019

(51) Int. Cl.
*G06F 9/44* (2018.01)
*G06F 8/71* (2018.01)
*G06F 16/903* (2019.01)
*G06F 8/10* (2018.01)

(52) U.S. Cl.
CPC ............... *G06F 8/71* (2013.01); *G06F 8/10* (2013.01); *G06F 16/90335* (2019.01)

(58) Field of Classification Search
CPC ......... G06F 8/10; G06F 8/71; G06F 16/90335
USPC ................. 717/101–103, 106, 120–121
See application file for complete search history.

(56) References Cited

U.S. PATENT DOCUMENTS

| | | | |
|---|---|---|---|
| 6,963,867 B2 * | 11/2005 | Ford | G06Q 30/02 707/752 |
| 7,617,205 B2 * | 11/2009 | Bailey | G06F 16/24578 |
| 8,694,530 B2 * | 4/2014 | Musgrove | G06F 16/2423 707/767 |
| 10,331,743 B2 * | 6/2019 | Lo | G06F 16/24575 |
| 10,768,798 B1 * | 9/2020 | Porath | G06T 11/206 |
| 10,776,350 B1 * | 9/2020 | Porath | G06F 3/04845 |

* cited by examiner

*Primary Examiner* — Ted T. Vo
(74) *Attorney, Agent, or Firm* — Rowand LLP

(57) ABSTRACT

Methods and systems for managing an online application database and application search. Search queries for applications are received from users. Unfulfilled queries are stored in memory. The platform identifies one or more application features based on the search queries within the stored unfulfilled queries, and generates an application build recommendation specifying the one or more application features. The application build recommendation is output to one or more developer accounts. If a new application is received, the platform may determine whether the new application contains features that sufficiently correspond to the features in one of the application build recommendations. User accounts that submitted the unfulfilled queries that served as the basis for the matching application build recommendation may be notified of the availability of the new application.

19 Claims, 10 Drawing Sheets

Application Build Recommendation

CATEGORY: _____

MERCHANT CLASS: _____

[ Prior Search Details ]

| Feature List | Relevance Score |
| --- | --- |
| • _____ | _____ |
| • _____ | _____ |
| • _____ | _____ |

[ Geographical restrictions ]

[ ACCEPT ]   [ DECLINE ]

FIG. 10

METHODS AND SYSTEMS FOR GENERATING APPLICATION BUILD RECOMMENDATIONS

FIELD

The present disclosure relates to computer-implemented online application stores and, in one implementation, to applications within an online commerce platform.

BACKGROUND

Online application stores are now fairly commonplace. In some cases, an online application store may contain a wide variety of general applications for a variety of purposes. Such stores may be focussed on providing a wide variety of applications for certain types of computing devices, such as the Apple™ App Store™ or Google™ Play™. In some cases, an online application store may be contain a range of applications relating to a particular type or class of user, such as applications relating to online commerce that may be useful to merchant users. In another case, the online application may contain a set of application relating to a particular category of applications, such as gaming.

The model of development adopted by many online application vendors is to have applications developed by external developers who then make their applications available through the application vendor's online application store. In the case of popular online application stores, there may be thousands or even tens of thousands of developer accounts associated with developers of applications, and there may be millions or even hundreds of millions of user accounts associated with users that may choose to download and, if applicable, purchase an application from the online application store.

It would be advantageous to improve the speed and efficiency of application development and discovery.

BRIEF DESCRIPTION OF THE DRAWINGS

Embodiments will be described, by way of example only, with reference to the accompanying figures wherein:

FIG. 10 illustrates one example of an application build recommendation interface.

DETAILED DESCRIPTION

Figure 1:
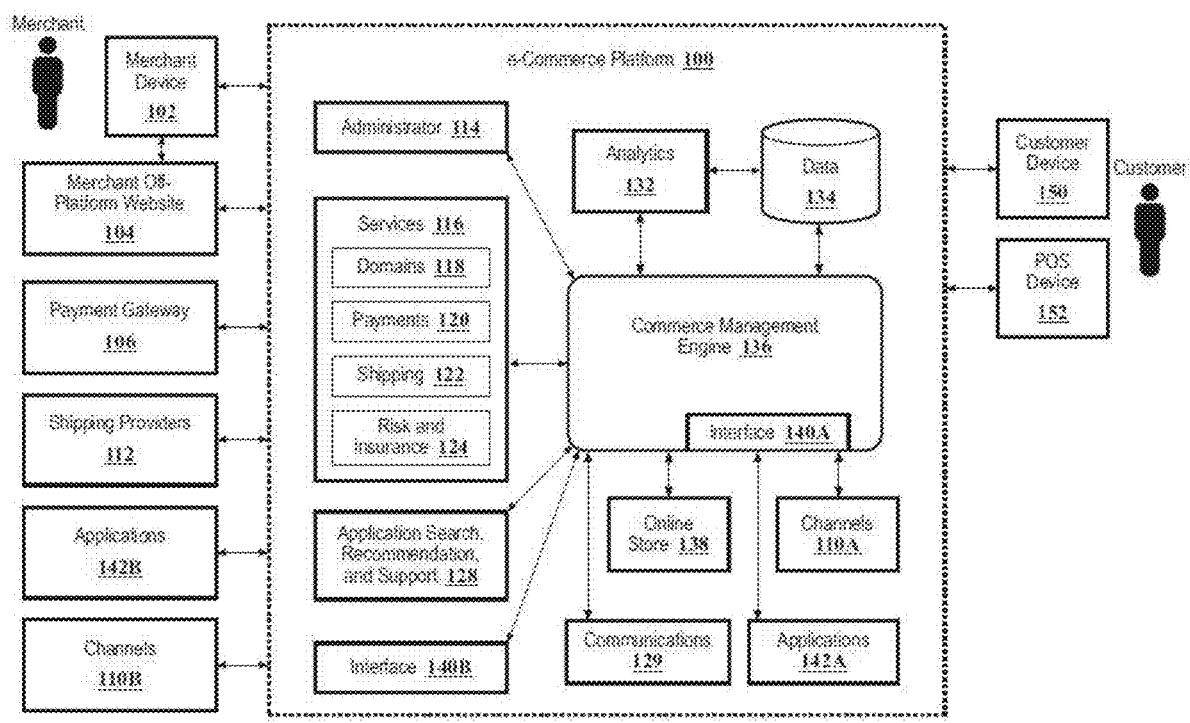
FIG. 1 is a block diagram of an e-commerce platform, according to one embodiment.

It would be advantageous to reduce the cost associated with inefficient and inaccurate development, storage and transmission, of application software in an online application store database through a method and system for improving the efficiency and accuracy of application development.

In one aspect, the present application describes a computer-implemented method of managing an online application database, the online application database storing applications and having at least one user account and at least one developer account. The method may include identifying at least one application search query from one of the user accounts as an unfulfilled query if the at least one application search query resulted in fewer than a predetermined number of relevant results; storing, in memory, a query string and metadata regarding the unfulfilled query; determining that a count of stored unfulfilled queries exceeds a threshold number and, in response, identifying at least one application feature based on query strings from the stored unfulfilled queries; generating an application build recommendation specifying the at least one application feature; and providing the application build recommendation to the at least one developer account.

In another aspect, the present application describes a system having at least one user account and at least one developer account. The system may include an online application database, the online application database storing applications; a processor; and a memory storing gap assessment software containing computer-executable instructions. When executed by the processor, the instructions may cause the processor to identify at least one application search query from one of the user accounts as an unfulfilled query if the at least one application search query resulted in fewer than a predetermined number of relevant results; store, in memory, a query string and metadata regarding the unfulfilled query; determine that a count of stored unfulfilled queries exceeds a threshold number and, in response, identify at least one application feature based on query strings from the stored unfulfilled queries; generate an application build recommendation specifying the at least one application feature; and provide the application build recommendation to the at least one developer account.

In some implementations, identifying the application search query may include determining, for each application search query that resulted in a non-null list of relevant results, that a user account associated with that application search query did not access any applications include in the non-null list of relevant results.

In some implementations, the metadata for each unfulfilled query includes, at least, an associated merchant identifier.

In some implementations, identifying at least one application feature may include determining that more than a minimum percentage of the query strings contain a keyword, wherein the at least one application feature includes the keyword. In some cases, identifying the at least one application feature may include determining that the keyword corresponds to a type of application feature among a plurality of types of application features. In some examples, the plurality of types of application features may include one or more of geographic location, product class, application sub-category, merchant class, or application function.

In some implementations, storing the query string and metadata may include determining an application category associated with the query string and metadata and storing the query string and metadata in associated with the application category, and determining that a count of stored unfulfilled queries exceeds a threshold number may include determining that a count of stored unfulfilled queries in association with the application category exceeds the threshold number.

In some implementations, the application feature includes one or more of application function, geographic location, product class, application sub-category, or merchant class.

In some implementations, providing the application build recommendation may include identifying a plurality of developer accounts and sending a notification to each of the plurality of developer accounts regarding the application build recommendation.

In yet a further aspect, the present application describes a non-transitory computer-readable medium storing processor-executable instructions that, when executed by one or more processors, are to cause the one or more processors to carry out one or more of the methods described herein.

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described. It will be appreciated that an e-commerce platform and its associated online application store is but one example context for the present application. The described methods and systems may be applied in the case of online application stores in the context of e-commerce, or in other contexts, including general online application stores or customer-specific online application stores or category-specific online application stores.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
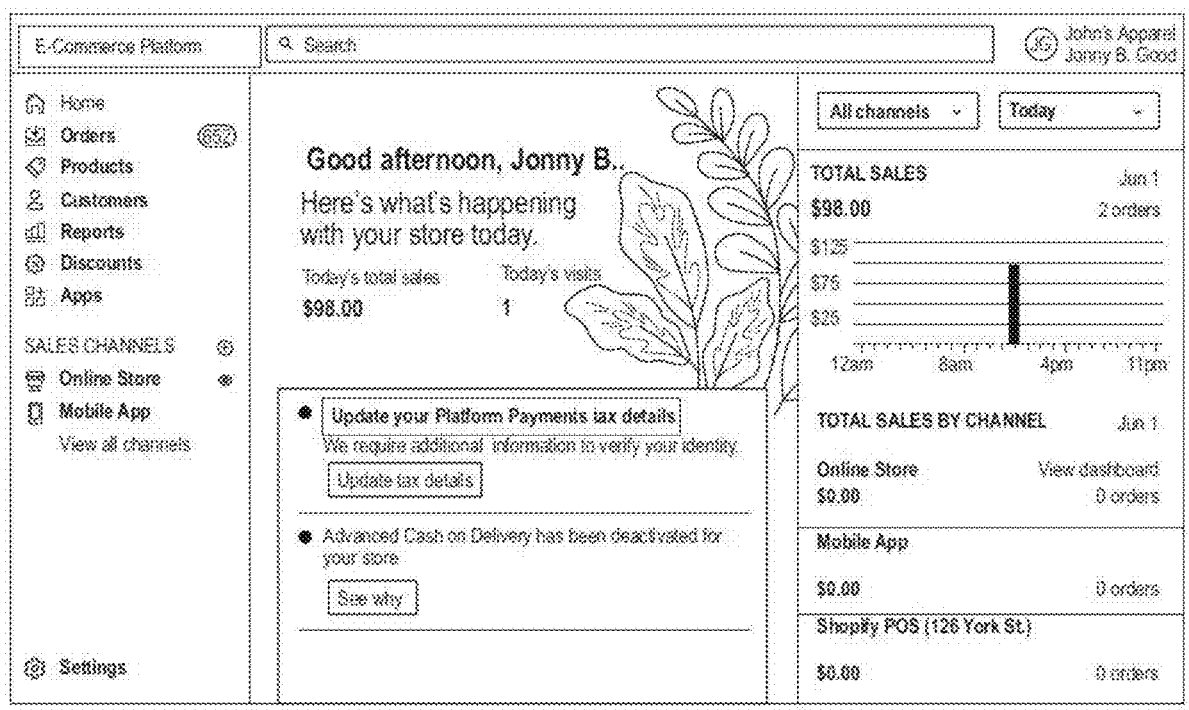
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Application Build Recommendations

Continuing with the example e-commerce platform 100, the application search, recommendation and support platform 128 may further facilitate the more efficient development, storage and deployment of applications through the determination and output of application build recommendations to developer accounts. This is notably distinct from the typical recommendation function in an online store, in which the online store tracks application downloads by a user account and provides the user account with recommendations for new applications based on past user history. In the present case, the platform 128 determines, based in part on a plurality of user searches within the platform 128, that an application having one or more particularly features is sought by users and unavailable via the platform 128; in such as case it generates an application build recommendation to provide to developer accounts to guide their application building activity and ensure more accurate matching between applications developed and user needs. This prevents developmental effort, bandwidth and storage being wasted on applications that have features poorly-matched to demonstrated user needs. It may also speed development and deployment of desirable applications, rendering the platform 128 more useful and responsive to user demands. Such guidance to developers is particularly useful in implementations in which the online e-commerce platform 100 is operated by an independent third party and development and uploading of applications to the e-commerce platform 100 is decentralized to enable fast development and deployment of applications. Given the decentralized nature of the network implementation of the e-commerce platform 100 in terms of its merchant user participation and the privacy and security requirements inherent to an online e-commerce platform, in which a significant degree of data and activity relating to a merchant must be securely stored and protected from unauthorized exposure, the independent developer users may have little to no ability to canvass or otherwise contact individual merchant users to survey them as to their needs.

Figures 3, 4:
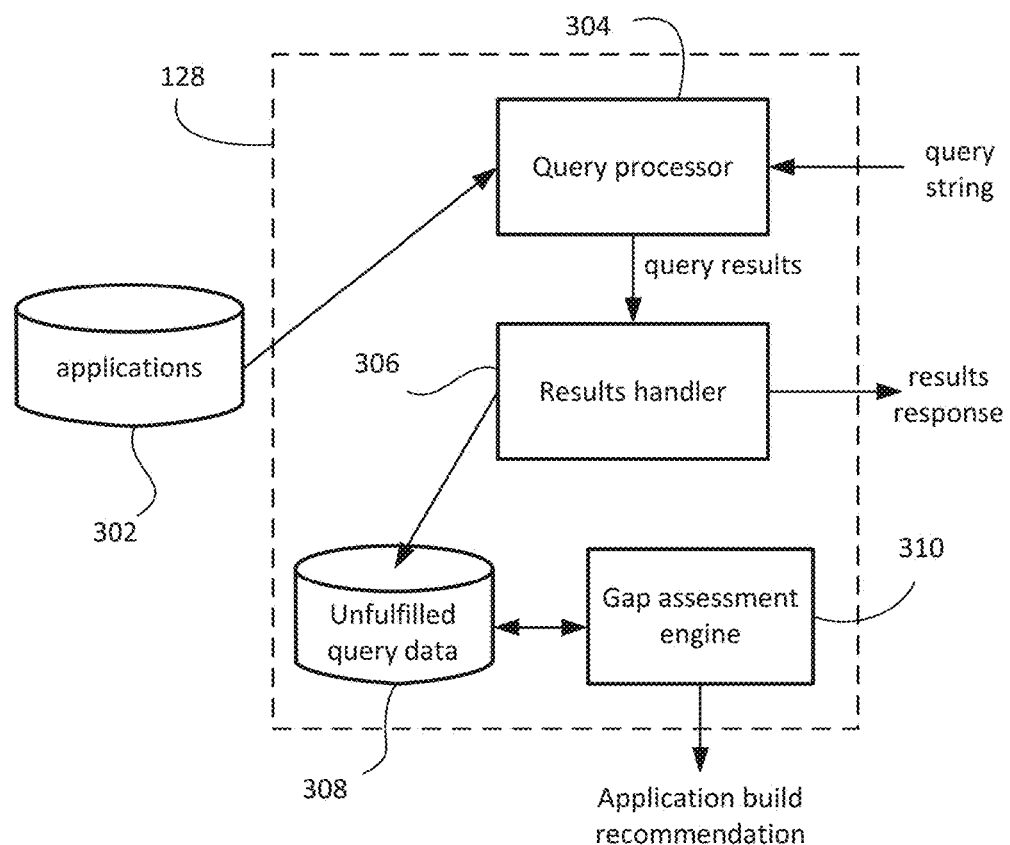
FIG. 3 illustrates one example of an application search, recommendation and support platform.
FIG. 4 shows a simple example of a data structure for storing an unfulfilled query.

FIG. 3 illustrates one example of the application search, recommendation and support platform 128. The platform 128 may implement at least some or the functionality described herein. An application database 302 may store a plurality of applications and associated metadata. The application database 302 may include a plurality of databases, some of which may be provided within the e-commerce platform 100 and some of which may be hosted external to the e-commerce platform 100.

The platform 128 may include a query processor 304 that receives and processes a query string. The query string is received in association with a user account. The user account may, in some cases, be a merchant account. The merchant, via a merchant device 102 (FIG. 1) or any other computing device, may browse through applications available in the application database using an application database GUI. The GUI may provide an option of inputting a query string. The query string may include a keyword, phrase, Boolean expression, or any other text input provided by a user account in search of a suitable application. The query processor 304 processes the query string based on metadata regarding the applications available in the application database 302 and returns query results.

A results handler 306 receives the query results and outputs a results response. The output of the results response may include preparing and transmitting results for display to the merchant via the application database GUI. The display may include a list of results, which may be ranked in order of calculated relevance to the query string. In some cases, the query processor scores applications for relevance and only those applications that meet a minimum relevance score are included in the results list. In some cases, if the query result is null, i.e. no application is considered relevant, then the results response may include a notification to the merchant that no results were found.

In accordance with an aspect of the present application, the platform 128 may further include a memory storing unfulfilled query data 308, and a gap assessment engine 310. The unfulfilled query data 308 includes query strings for which less than a predetermined number of relevant results were identified. That is, when one of the queries is processed by the query processor 304 and results are returned, then the results handler 306 assesses whether the results include at least the predetermined number of results, e.g. at least a minimum number of relevant results. "Relevant" results may include those results that have at least a minimum relevance score, in terms of their fitness or match to the query string. The minimum relevance score may be configurable. In some cases, the query processor may be configured to only provide query results that include relevant results, i.e. applications that meet the minimum relevance score requirement. If the query results include fewer than the predetermined number of relevant results, then the results handler 306 stores the query string in memory as unfulfilled query data 308. The results handler 206 may include associated metadata, including, for example, the user account associated with the query string. It may further include in the record the query results or other metadata associated with the query.

The gap assessment engine 310 monitors the unfulfilled query data 308 and determines whether the unfulfilled query data 308 identifies an application feature sought by users and unavailable or insufficiently available in current applications. If such a feature is detected using the unfulfilled query data 308, then the gap assessment engine 310 may output an application build recommendation that includes, at least, the identified application feature.

The gap assessment engine 310 identifies an application feature based, at least in part, on the query strings stored in the unfulfilled query data 308. The query strings may contain words, phrases, and/or Boolean expressions. The gap assessment engine 310 may use various mechanisms for analyzing the query strings to identify one or more application features sought by the users that generated those query strings. As an example, a desired application feature may be identified on the basis of that feature, or a keyword associated with that feature, appears in more than a threshold number, or percentage, of query strings. In some implementations, natural language processing techniques may be used by the gap assessment engine 310 to parse the query strings to identify application features. In one example, candidate application features may include a pre-defined set of keywords and/or keyphrases that are likely to be identified as application features; the set may be updated from time-to-time to add or remove candidate application features. The gap assessment engine 310 in such an embodiment may determine from the query strings whether a certain number of the query strings relate to any one or more of the candidate application features. In some cases, the keyword or keyphrase matching techniques may be employed.

In some cases, the gap assessment engine 310 may use metadata associated with query strings when identifying an application feature. For example, each query string may have metadata stored in association therewith. As an example, the metadata may include information regarding the class or category of user that generated the query. The gap assessment engine 310 may use the class or category of user as additional data in determining the application feature sought. To illustrate, a subset of the query strings may be generated by a particular class of user, such as merchants of clothing products, and the fact that the queries originate from merchants of clothing products may provide additional context for analyzing their query strings and identifying the application feature sought. As an illustration, if the percentage of the query strings include a keyword like "size" the gap assessment engine 310 may rely on the merchant class to identify the application feature as relating to clothing sizes.

In another example, the metadata may include a category or sub-category of product or service, if any, to which the query was directed. That is, when a user inputs a query for an application, the query may be input in relation to a specific category (or sub-category) of application type. To illustrate by example, a query string may have been input in a search specified to be for applications in the category of "games" or "accounting" or "messaging" or "billing and payments" or "tax" or any other such category or sub-category. The application category to which the search was directed may be used in association with the query string to more accurately determine the application feature(s) sought in the search.

In another example, the metadata may include geographical location data with regard to the query string. In one case, the geographical location data may include a location associated with the user account that generated the query string. In another case, the geographical location data may be a parameter specified either in the search interface or within the query string itself. The location of the user account may provide some inferred context to the query string to the extent that it refers to keywords or keyphrases that have a geographically-dependent meaning or understanding. In some cases, the query may specify, either in the query string or in metadata associated with the query string, a geographical location to which the query is directed. As an illustrative example, the query string may include keywords such as "local tax calculator" or the like, and the geographical location (whether associated with the user account, contained in the query string, or otherwise associated with the query) may indicate a specific jurisdiction, country, or state, or municipality. That geographic context may be used by the gap assessment engine 310 in determining the application feature sought in some example. For instance, if there are number of queries that relate to state level tax calculations for product sales across a number of states, it may indicate the application feature sought is a multi-state sales tax calculator. Conversely, if a substantial percentage of those queries relate to a specific state or country, it may indicate that existing applications lack a sales tax calculator for that specific state or country.

In some cases, the gap assessment engine 310 monitors the unfulfilled query data 308 and, as each new unfulfilled query string is added, it assesses whether the quantity of stored unfulfilled queries has reached a threshold number to trigger an analysis of the query strings to identify whether an application feature is identifiable. In some cases, the analysis may be carried out by the engine 310 with each new query string added to the unfulfilled query data 308. In some cases, the unfulfilled query data 308 may be stored in relation to the application category(ies) to which it relates, and the analysis is carried out by the engine 310 when the number of unfulfilled queries stored in associated with a particular category exceeds a threshold number. In some other cases, the analysis is carried out by the engine 310 on a periodic basis, irrespective of the number of new unfulfilled queries added.

The gap assessment engine 310 may perform its analysis of the query strings to attempt to identify one or more application features sought by the unfulfilled query data 308. That assessment may result in one or more application features detected from the query strings. Each detected application feature may have an associated confidence score generated by the engine 310 based on its analysis and reflecting a mathematical confidence calculation regarding the certainty with which the query strings relate to the identified application feature. The engine 310 may output an application build recommendation if the confidence score exceeds a pre-set minimum level of sufficient confidence. The pre-set minimum level may be configurable by an administrator of the e-commerce platform 100. In some cases, the engine 310 may only output an application build recommendation if at least a threshold number of features are identified with at least a pre-set minimum level of confidence.

The gap assessment engine 310 may be implemented in software and may include instructions, logic rules, machine learning, artificial intelligence, or combinations thereof. For example, a machine learning engine may be configured to track applications in active use in the application marketplace and determine their level of success based on one or more of number of downloads, usage metrics, paid usage, or user reviews. Those factors may be broken out by geography, feature, product category, etc. Based on this information, the machine learning engine may be adapted to discover application features leading to successful applications, and thus, develop a predictive capability for determining application features that, in combination, may be likely to result in a successful application given the application features identified from the stored query strings. The machine learning engine may also be useful in classifying and prioritizing the query strings.

The unfulfilled query data 308 may be stored in any suitable data structure using any suitable memory configuration that makes the data available to the gap assessment engine 310 for analysis. The memory storing the unfulfilled query data 308 may be configured as a database in some cases. FIG. 4 shows one simple example of a data structure 400 for storing an unfulfilled query. The data structure 400 may include, for example, an index number 402 or other identifier for the specific entry, and a query string 404 that records the query string (and/or elements thereof) that resulted in the unfulfilled query results.

The data structure 400 may, in some cases, also include a user identifier identifying the user account associated with submission of the query, such as a merchant ID 406 or the like. It may include an application category 408, which in some cases may have been a category within which the query was generated or submitted. The application category 408 may have been assigned by the query processor 304 (FIG. 3) based on its analysis of the query string 404 in some cases. The data structure 400 may also include a time stamp, such as a date and/or time 410 associated with the query. The date and/or time 410 may be useful in that some queries may become too stale or old to be considered by the gap assessment engine 310, or the date associated with a query string may be used to weight its value in the analysis performed by the gap assessment engine 310. Query strings older than a certain age may be purged from the store of unfulfilled query data 308 (FIG. 3) in some cases.

The data structure 400 may include a results data 412 that reflects the query results generated by the query processor 304 based on the applications available at the time and date that the query string 404 was processed. The results data 412 may include the number and/or list of applications, if any, returned in the query results and, in some cases, their associated relevance score to the query.

In some cases, the data structure 400 may include other metadata 414. Non-limiting examples of other metadata include geographic location associated with the user account, class or category of user account, application activity data of a user account e.g. data indicative of a current application status for any of the applications returned in the results, such as whether the applications are downloaded, installed, activated, de-installed, or deleted, or other contextual information relating to the query or the user account that submitted the query.

Figure 5:
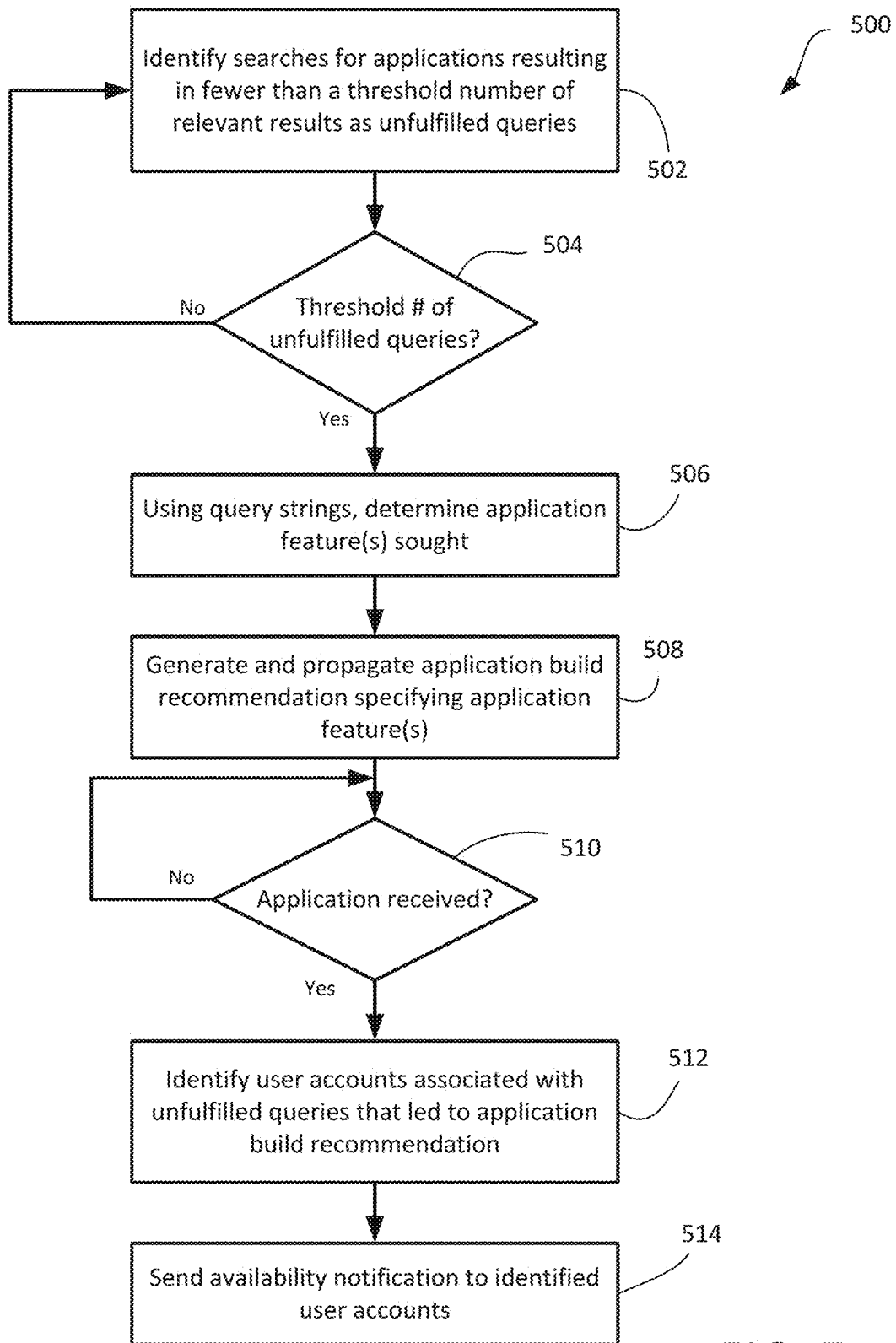
FIG. 5 shows, in flowchart form, one example method for managing an e-commerce platform having an online application store from which users may obtain applications.

Reference will now be made to FIG. 5, which shows, in flowchart form, one example method 500 for managing an e-commerce platform having an online application store from which users may obtain applications. The platform provides a search functionality to permit users to input a search query in order to locate suitable application in the application store. In operation 502, the platform identifies searches, e.g. query strings and associated metadata, that result in fewer than a predetermined number of relevant results. That predetermined number may be 1 in some cases, i.e. the searches identified in operation 502 are those that have a null result. That predetermined number may be 2 or more in some other implementations. In operation 502, the platform stores those searches, i.e. unfulfilled query data, in memory.

In operation 504, the platform assesses whether there are at least a threshold number of unfulfilled queries stored in memory and available for analysis. In some implementations, operation 504 compares a count of stored unfulfilled queries to the threshold number, which may be configurable by an administrator of the platform in some cases. In some implementations, operations 502 and 504 group unfulfilled queries in application categories and operation 504 involves assessing whether the count of queries in any of the application categories meets the threshold number. Instead of application categories, the categories may relate to other ways of categorizing searches depending on the nature of the platform and the implementation.

If the comparison in operation 504 indicates there are at least the threshold number of unfulfilled queries stored, then in operation 506 the platform identifies one or more application features sought by users based on, at least, the query strings stored in the unfulfilled queries. As described above, other factors may be used by the platform in identifying application features, such as application category associated with the query, class or category of user, geographical information, and the like. In some cases, an application feature may not be identifiable with sufficient confidence from the available stored unfulfilled queries, in which case operations 502, 504 and 506 continue (not illustrated) until such time as an application feature is identified with sufficient confidence.

The one or more application features may include a category of application, a function or operational use, a geographical area or jurisdiction, a customer characteristic, a product or service category, or other operational or characterising features of an application. The category of application may indicate a type of application, e.g. productivity, gaming, accounting, music/video streaming, news feed, social media, purchasing, shipping, etc. It will be appreciated that the taxonomy of categories applicable to a platform may vary from implementation to implementation as they range of potential applications and their functionality may vary based on the type of application store being offered. The feature of function or operational use may indicate a particular functional characteristic of the application. Illustrative examples may include, assuming an example category of purchasing, "one-click check-out", "credit card processing", "refund payments", "store credits processing", "gift card payments" or the like. The feature of geographical area may refer, for example, to the geographical area in which the merchant operates, the geographical area in which purchasers reside, or the geographical area or jurisdiction to which the application specific relates, such as a specific country, state or municipality. The feature of operational or characterizing features of an application may refer to some feature or functionality desired in the application, such as, for example, touchscreen capability, compatibility with a certain plug-in, compatibility with a certain operating system, availability of certain languages, character sets, fonts, or other graphical user interface features, and any other such feature.

The one or more application features identified in operation 506 may be assembled into an application build recommendation. The application build recommendation may, in one example, include the one or more application features and some metadata regarding the queries. For example, data regarding the user accounts associated with the queries may be provided. This may include a count of queries, the location of the user accounts, (aggregated) revenue or sales information associated with the user accounts (without revealing individual data), geographic location(s) associated with the user accounts, or the like. The metadata may include time information associated with the queries, e.g. indicating how recently the queries were received. It may include information regarding the most-closely related applications available in the application store. It may include non-query related information regarding application development requirements for the platform.

The application build recommendation may be transmitted to one or more developer accounts in operation 508. In one example, all developer accounts with the platform may receive a notification detailing the application build recommendation. In another example, a subset of developer accounts is identified based, perhaps, on geography, self-identified categories of interest or competency, or previous applications uploaded to the store. In some implementations, transmission of the application build recommendation includes sending a message, whether by email, instant message, social media posting, or through some other messaging channel, to notify the developer account of the application build recommendation or its availability. In some implementations, rather than actively notifying the developer accounts, the application build recommendations are collected and made available for review by interested developers, perhaps via a developer interface to the platform.

Having propagated the application build recommendation, the platform may monitor for receipt of an application that satisfies the features identified in the application build recommendation. In operation 510, the platform may evaluate whether a suitable application has been received that satisfies the application build recommendation. For example, the platform may parse the application metadata (e.g. the title, description, keywords, feature list, etc.) received via a developer account to determine if the application meets the application build recommendation and/or the application features sought. In some cases, the platform may use the same techniques as used by the gap assessment engine 301 (FIG. 3) to make that determination. If a suitable application has been received, then in operation 512, the platform may identify those user accounts associated with queries used in generating the application build recommendation and may send an availability notification regarding the new application to those user accounts in operation 514.

Figure 6:
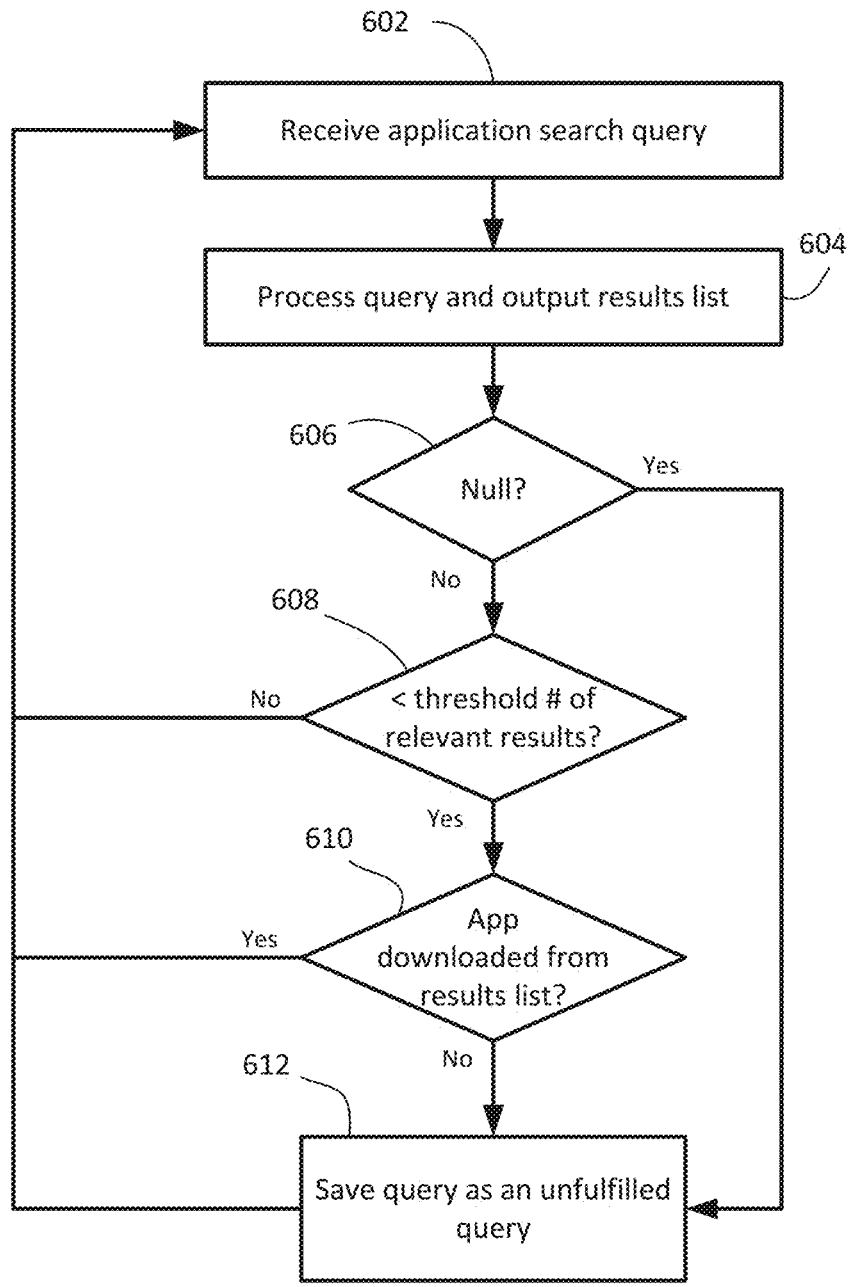
FIG. 6 shows a flowchart illustrating a simplified example method of storing unfulfilled query data.

Reference will now be made to FIG. 6, which shows a flowchart illustrating a simplified example method 600 of storing unfulfilled query data. The method 600 may be carried out by an application search, recommendation and support platform 128 (FIG. 1) in some implementations.

The method 600 includes receiving an application search query in operation 602. As described previously, the application search query may be received in association with a user account. A user may access the e-commerce platform from a user device, such as a merchant device, via a web interface. By providing login credentials, the user may log into the user's user account via the web interface. The web interface may provide an interface to the application store, through which the user may browse available applications and initiate a search for an application. The search facility in the web interface may allow the user to specify certain filters, e.g. application category, geographical applicability, currency, etc., and may permit the user to input a search string, i.e. a query string. Operation 602 includes receiving the query string and any associated metadata, such as a user identifier, filter settings, etc.

In operation 604, the search query is processed and results are output. If the results are NULL, as indicated by operation 606, then the search is saved in memory as unfulfilled query data in operation 612. Results may be NULL if no applications in the store are identified as a result of processing the query string.

If the results are non-null, then in some embodiments the count of relevant results may be compared to a threshold as indicated by operation 608. If there are at least a predetermined number of relevant results, then the method returns to operation 602 to receive the next query. If there are fewer than the predetermined number of relevant results, then the platform may assess a current application status, e.g. whether the user account has downloaded, purchased, installed, implemented or is otherwise using one of the applications on the results list, as indicated by operation 610. If the user account is using one of the applications on the results list (e.g. current application status is active, downloaded, purchased, installed, in-use, etc.), it may indicate that the query was fulfilled, at least to a degree of user satisfaction, and the method 600 may return to operation 602. Otherwise, the query string and metadata are saved as unfulfilled query data in operation 612.

It will be appreciated that the operations of method 600 may be staggered in time. That is, the assessment of whether a query is unfulfilled, particularly in operation 610 may be delayed to assess whether the user is using one of the identified applications in due course. In some implementations, the query string may be added to the unfulfilled query data after operation 608, but may be subsequently removed if, in operation 610, it is later determined that the user is using one of the applications in the results list. In yet other implementations, the platform may later re-assess the application status and determine whether the user account still uses or has deleted the application initially downloaded or installed from the results list, since in some cases the user may attempt to utilize an application identified in the results list and may later determine that the application fails to meet the needs of the user reflected in the query string.

Figure 7:
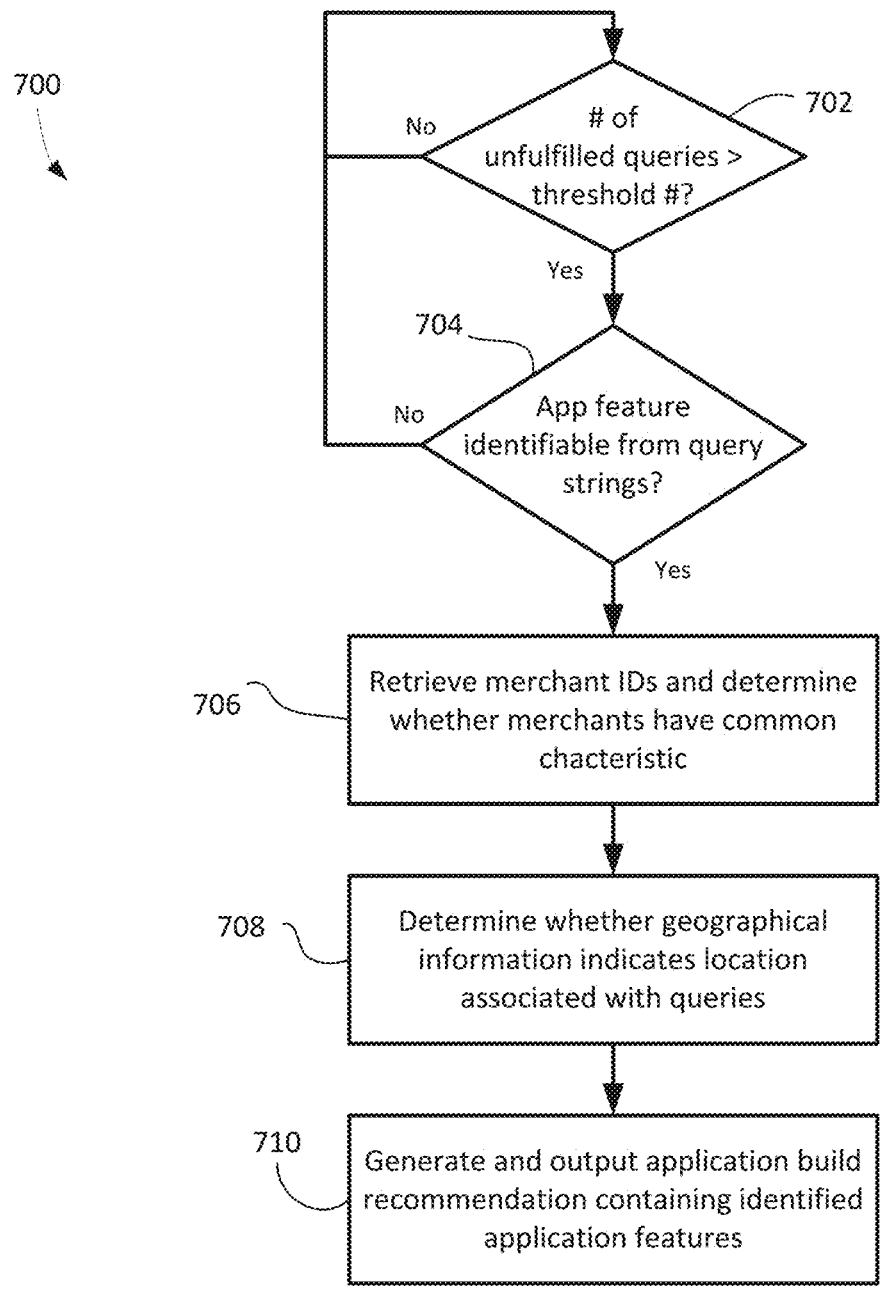
FIG. 7 shows, in flowchart form, one example method of generating an application build recommendation.

Reference is now made to FIG. 7 which shows, in flowchart form, one example method 700 of generating an application build recommendation. The method 700 presumes that the operations of storing unfulfilled queries are taking place and that a number of unfulfilled queries are available. The method 700 may be carried out by way of software containing computer-readable instructions that, when executed by one or more processors of a computer, cause the computer to implement the operations described. With reference to FIG. 3 as an example, the operations of the method 700 may be implemented by way of the gap assessment engine 310 (FIG. 3). In general, the description below will refer to the method 700 being carried out by a processor.

In operation 702, the processor determines whether the number of unfulfilled queries has exceeded a threshold number. In some implementations, operation 702 may include comparing a count of stored unfulfilled queries to the threshold number, which may be configurable by an administrator of the platform in some cases. In some implementations, unfulfilled queries may be grouped into application categories and operation 702 may involve assessing whether the count of unfulfilled queries in any one of the application categories meets the threshold number. In some cases, different categories may have different threshold numbers. Instead of application categories, the categories may relate to other ways of categorizing searches depending on the nature of the implementation.

In operation 704, if the threshold number of unfulfilled queries is met or exceeded, then the processor may analyze the query strings from those unfulfilled queries with a view to identifying an application feature(s) sought by the searches. Operation 704 may include assessing whether at least a minimum number, or percentage, of the query strings have an application feature(s) in common. This may include identifying a keyword or keyphrase that occurs in the minimum number or percentage of query strings. It may include using natural language processing techniques to identify a search intent, and determining that at least the minimum number or percentage of query strings have the same search intent.

If the query string analysis in operation 704 identifies at least one application feature, then in operation 706, the user identifiers associated with the query strings that included the application feature may be assessed to identify if they have common features or characteristics. For example, using the case of e-commerce and merchants, all the merchants seeking an application having the identified application feature may be in the category of "clothing retailers", or "book retailers", or "car repair", or some other class or category of merchant.

In operation 708, the processor may retrieve geographical data associated with the query strings that included the application feature. The geographical data may include data regarding the location of the user submitting the query, data regarding the location of the customer base of the user submitting the query, or data in the query regarding the location for which an application is sought. The processor may determine whether the queries appear to relate to a specific geographical location, and whether that location is the location of the merchant, the customer, or the problem to be addressed by the application, as examples.

It will be appreciated that operations 706 and 708 provide specific examples of data that may be retrieved from the query strings or metadata associated with the query strings that sought the application feature. Other data may be obtained from the query strings or metadata to identify other characteristics of the application sought.

In operation 710, the processor generates and outputs an application build recommendation. The application build recommendation includes the application feature(s) identified in operation 704. It may further include an application category or categories, if the queries were determined to relate to a specific application category or categories. It may also include data regarding the merchant category, if one was determined in operation 706, or data regarding the geographic location, if one was determined in operation 708. It may further include data regarding any other common characteristic that the processor is able to identify from the query strings and their metadata.

Figure 8:
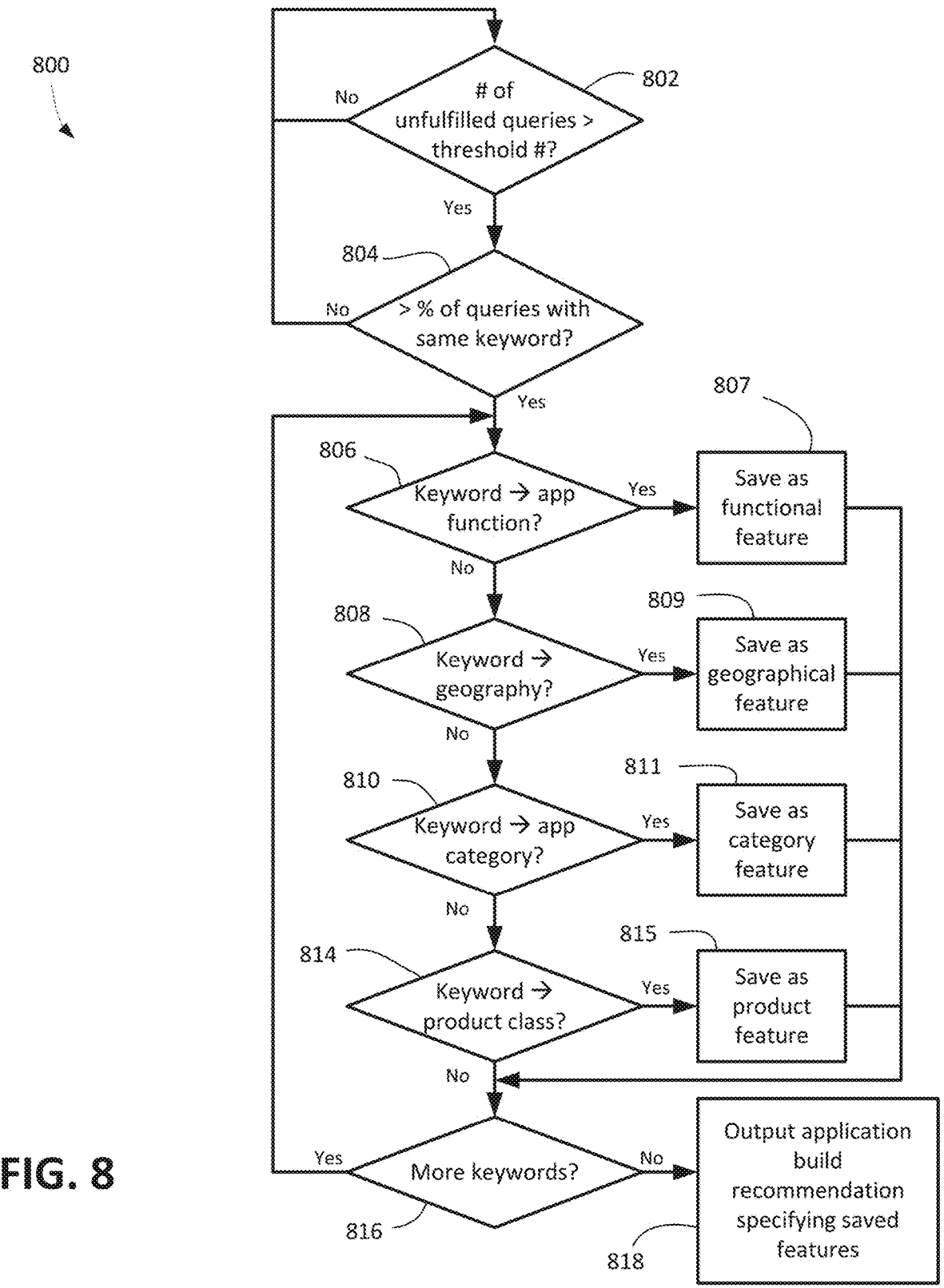
FIG. 8 shows another simplified example of a method for generating an application build recommendation.

Reference will now be made to FIG. 8, which shows another simplified example of a method 800 for generating an application build recommendation. The method 800 presumes that the operations of storing unfulfilled queries are taking place and that a number of unfulfilled queries are available. The method 800 may be carried out by way of software containing computer-readable instructions that, when executed by one or more processors of a computer, cause the computer to implement the operations described. With reference to FIG. 3 as an example, the operations of the method 800 may be implemented by way of the gap assessment engine 310 (FIG. 3). In general, the description below will refer to the method 800 being carried out by a processor. The method 800 is focused on keyword-based application feature identification, as an example mechanism for identifying application features from query stings and metadata.

In operation 802, the processor determines whether the number of unfulfilled queries has exceeded a threshold number. In some implementations, operation 802 may include comparing a count of stored unfulfilled queries to the threshold number, which may be configurable by an administrator of the platform in some cases. In some implementations, unfulfilled queries may be grouped into application categories and operation 802 may involve assessing whether the count of unfulfilled queries in any one of the application categories meets the threshold number. In some cases, different categories may have different threshold numbers. Instead of application categories, the categories may relate to other ways of categorizing searches depending on the nature of the implementation.

In operation 804, if the threshold number of unfulfilled queries is met, then the processor may analyze the query strings from those unfulfilled queries with a view to identifying if there is an identifiable an application feature(s) sought by the searches. The metadata may be included in the analysis in some implementations. Operation 804 may include assessing whether at least a minimum number, or percentage, of the query strings have a keyword or keyphrase in common. If not, then the method 800 returns to operation 802. Keywords or keyphrases may be identifies as being "in common" even if not identical on the basis that they are synonyms or are directed to the same or a similar concept. In other words, keywords or keyphrases that are sufficiently similar may be considered to be "in common", where sufficiently similar means that they are have the same or a similar meaning.

If at least the minimum number of percentage of query strings have a keyword or keyphrase in common, then in operation 806, the processor may assess whether the keyword or keyphrase is directed to an application function. An application function may be an operation or functionality that the application is capable of carrying out. For example, "credit card payment processing", "fraud detection", "social media integration", or other functional features or descriptions of the application's purpose or utility, may be considered "application function". If the keyword or keyphrase is identified as an application function, then in operation 807, that identified application function is saved as a function feature.

In operation 808, the processor may assess whether the keyword or keyphrase is directed to geography. Geography keywords or keyphrases may be found in the query strings or the metadata. As discussed above, geographical data may relate to the location of the merchant, the location of the customer, the location of product for shipping, or a specific jurisdiction of concern for whatever reason. If the keyword or keyphrase relates to geography, such as country, region, state, province, or municipality, then in operation 809 that keyword or keyphrase is saved as a geography feature.

In operation 810, the processor may determine whether the keyword or keyphrase is directed to an application category or sub-category. Operation 802 may have been limited to a category, to the extent that the search queries are grouped by application category, in which case operation 810 may involve identifying whether the keyword or keyphrase identifies a sub-category within that category. If the keyword or keyphrase relates to an application category or sub-category, then in operation 811 that keyword or keyphrase is saved as a category feature.

In operation 814, the processor may determine whether the keyword or keyphrase is directed to a product class. The keyword or keyphrase may relate to a specific product or service or a class of products or services. For example, the processor may determine that the applications sought by the query strings generally relate to "sneakers", "watches", "children's toys", "accounting services", or some other product or service class or category. If a product class is identified by the keywords or keyphrases, then in operation 815 the processor saves the product lass as a product class feature.

Other types of keywords or keyphrases that may be identified may relate to currency, language, etc.

In operation 816, the processor may assess whether there are further keywords or keyphases identified in operation 804 that are to be analyzed. If so, the method 800 returns to operation 806. If not, then in operation 818, the processor generates the application build recommendation. The application build recommendation includes all the saved features identified in operations 806-814.

As noted above, the application build recommendation is output by the platform to one or more developer accounts. The output may be an active notification transmitted to one or more addresses associated with the developer accounts and containing the application build recommendation. The output may be a notification to one or more addresses associated with the developer accounts advising of the availability of the application build recommendation from another available source or posting. The output may be a posting of the application build recommendation in a social media feed, a website, an RSS feed, or other medium accessible to developer accounts.

Figure 9:
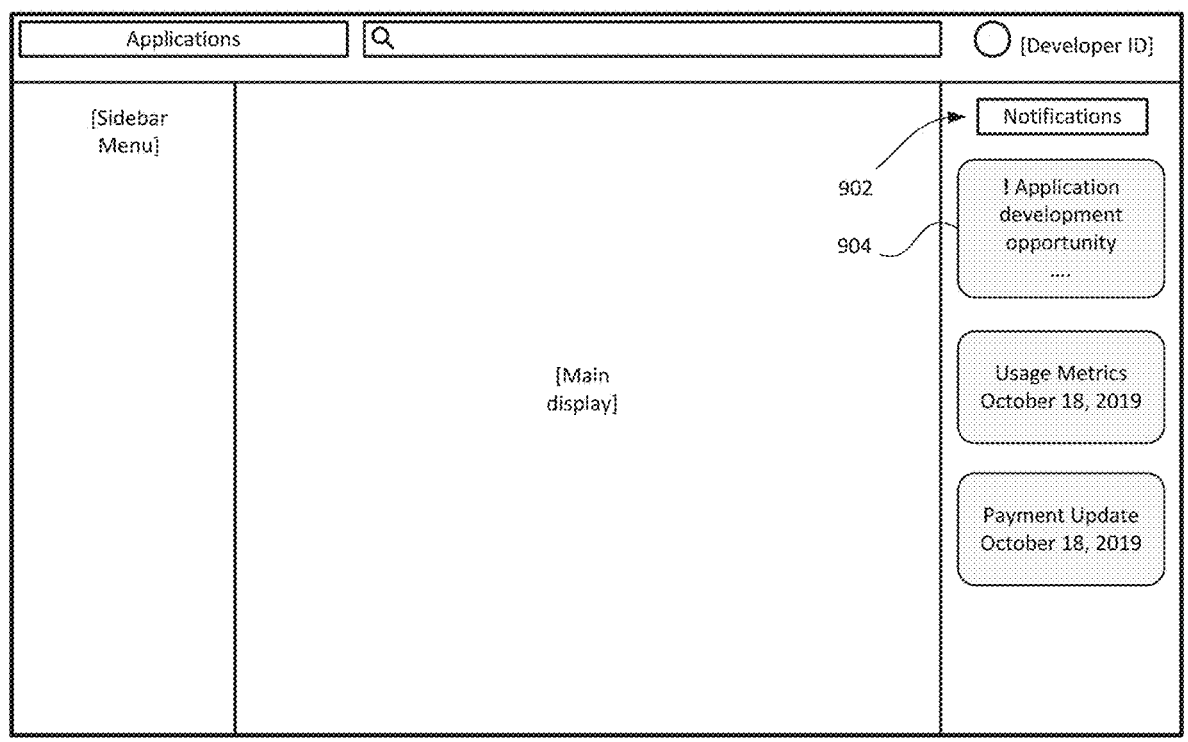
FIG. 9 illustrates an example of a simplified developer graphical user interface.

FIG. 9 illustrates an example of a simplified developer graphical user interface 900. The interface 900 may be an HTML-based webpage in some examples. The interface 900 may be displayed via a web browser when a developer logs into their developer account using a computing device. The interface 900 may be displayed on an application operating on a local computing device and relating to the e-commerce platform, when the application provides the platform with developer credentials for a developer account. It will be appreciated that the interface 900 is not necessarily a "home" page or first interface.

The interface 900 may provide a variety of developer-relevant content. In particular, the interface 900 may include a notification section 902. The notification section 902 may post notifications that are directed to or are potentially relevant to the developer account. As examples, a developer may receive notifications relating to payments to be made to the developer for usage of the developer's application(s) by users of the platform, or notifications relating to usage metrics regarding the developer's application(s) on the platform. As another example, the illustrated notification section 902 includes an "app development opportunity" notification 904 intended to notify the developer of the availability of a new application build recommendation.

Selection of the "app development opportunity" notification 904 may result in display of the build guide recommendation details. FIG. 10 illustrates one example of an application build recommendation interface 1000. The interface 1000 may provide information regarding the application category, merchant class, functions or features that were identified by the platform when generating the application build recommendation. It may further provide access to details of the search queries (suitably anonymized to avoid revealing personal details of searchers) in some implementations. It may further provide any geographical data or restrictions identified by the platform when generating the application build recommendation. It may further provide score data relating to the confidence with which the platform was able to determine each identified function or feature, i.e. its potential relevance score.

In some cases, the interface 1000 may further provide actuable user interface elements to accept or decline the application build opportunity. Selection of the decline button may result in deletion of the notification and/or the application build recommendation. Selection of the accept may trigger a further process, such an enrolment process to formal enroll the developer in the process of developing an application aimed at meeting the application build recommendations. In some cases, acceptance may simply result in the platform identifying future submissions by the developer to assess whether any newly-uploaded applications relate to the application build recommendation, without more formally tracking their progress or following-up.

Figure 11:
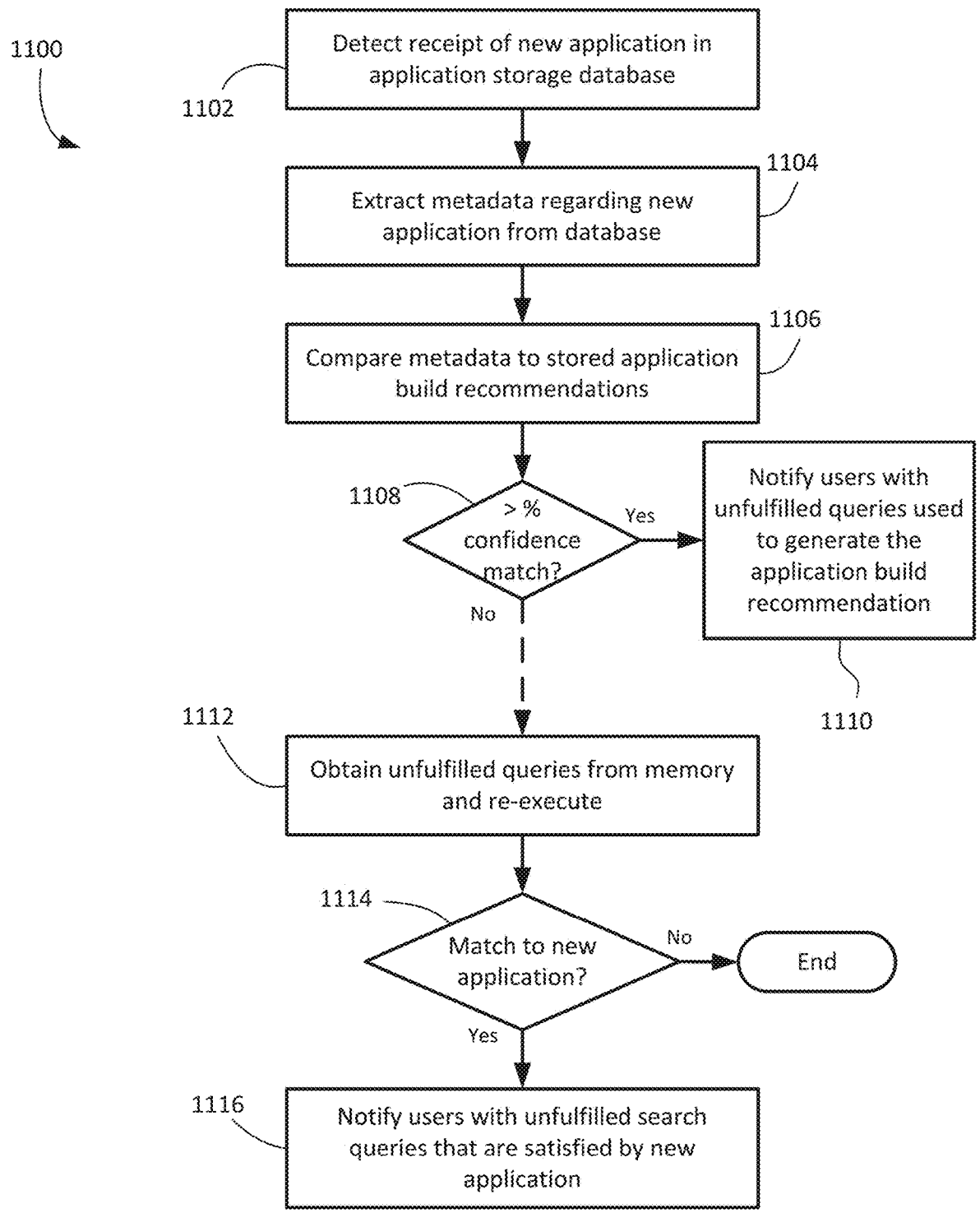
FIG. 11 shows, in flowchart form, one example of a method of notifying users regarding potentially relevant new applications.

Irrespective of whether the platform tracks developer activity or not in connection with the building of applications, and irrespective of whether there is any formal enrolment process for engaging developers to work on application build recommendations, the platform may seek to identify when a new application satisfies a past application build recommendation. FIG. 11 shows, in flowchart form, one example of a method 1100 of notifying users regarding potentially relevant new applications.

The method 1100 may be implemented by way of software containing computer-readable instructions that, when executed by one or more processors of a computer, cause the computer to implement the operations described. With reference to FIG. 1 as an example, the operations of the method 1100 may be implemented by way of the application search, recommendation and support platform 128 (FIG. 1) or by some other component or module in the e-commerce platform 100 (FIG. 1). In general, the description below will refer to the method 1100 being carried out by a processor.

The method 1100 may include identifying whether an application newly-uploaded to the platform relates to a previously-generated application build recommendation. If so, then the platform may identify the users that sought such an application in the past and advise them of its availability.

The method 1100 may begin with operation 1102 in which the platform detects receipt of a new application. The new application may be uploaded to an application store by the developer. In some cases, the new application may be authorized or approved by an administrator of the platform before being made available to users in the application store.

When a new application is detected in operation 1102, then in operation 1104 the platform may extract metadata regarding the application. The application may, in some cases include a manifest or other such document or file providing details regarding the application and its functions or features. In some cases, the developer may provide an application title, category, narrative description, and other such metadata when uploading the application to the application store. The platform may then, in operation 1106, compare the extracted metadata regarding the application to a stored set of previously-generated application build recommendations.

The comparison may result in a match or partial match between the extracted metadata and the features, functions, and other details in one of the application build recommendations. The partial match may be indicated by a level of confidence, e.g. a percentage match or the like. If the level of confidence in the match is below a threshold confidence, in operation 108, then the method 1100 may end. However, if there is at least a threshold confidence in the match, then in operation 1110 the platform may notify users of the available new application. In particular, the platform may identify the users that sought such an application unsuccessfully and generated unfulfilled queries that were the basis for generating the application build recommendation. The platform may have stored in association with the application build recommendation a list of user identifiers corresponding to those queries that served as the basis for the generation of the application build recommendation. The platform may have stored the queries that served as the basis for the application build recommendations, and the queries may each identify the user that created the query. In some cases, operation 1110 may involve excluding identified users that have subsequently downloaded an application in the same application category or sub-category.

In some embodiments, as an alternative to operations 1106-1110, or in addition to operations 1106-1110, as indicated by the dashed line, the platform may retrieve and reprocess unfulfilled queries as indicated by operation 1112. Unfulfilled queries may be stored in the unfulfilled query database. In some cases, only unfulfilled queries that related to the application category associated with the new application may be re-processed. By re-processing the unfulfilled queries, the platform may determine whether the new application meets the query by being a relevant result 1114. If not, then the method 1100 may end. If the new application is a relevant result to one of the reprocessed queries, then the platform may notify the user that generated the query, as indicated by operation 1116.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method of managing an online application database, the online application database storing applications and having at least one user account and at least one developer account, the method comprising:

identifying at least one application search query from one of the user accounts as an unfulfilled query if the at least one application search query resulted in fewer than a predetermined number of relevant results;

storing, in memory, a query string and metadata regarding the unfulfilled query;

determining that a count of stored unfulfilled queries exceeds a threshold number and, in response, identifying at least one application feature based on query strings from the stored unfulfilled queries;

generating an application build recommendation specifying the at least one application feature; and providing the application build recommendation to the at least one developer account.

2. The computer-implemented method of claim 1, wherein identifying the application search query includes determining, for each application search query that resulted in a non-null list of relevant results, that a user account associated with that application search query did not access any applications include in the non-null list of relevant results.

3. The computer-implemented method of claim 1, wherein the metadata for each unfulfilled query includes, at least, an associated merchant identifier.

4. The computer-implemented method of claim 1, wherein identifying at least one application feature includes determining that more than a minimum percentage of the query strings contain a keyword, and wherein the at least one application feature includes the keyword.

5. The computer-implemented method of claim 4, wherein identifying the at least one application feature includes determining that the keyword corresponds to a type of application feature among a plurality of types of application features.

6. The computer-implemented method of claim 5, wherein the plurality of types of application features include one or more of geographic location, product class, application sub-category, merchant class, or application function.

7. The computer-implemented method of claim 1, wherein storing the query string and metadata includes determining an application category associated with the query string and metadata and storing the query string and metadata in associated with the application category, and wherein determining that a count of stored unfulfilled queries exceeds a threshold number includes determining that a count of stored unfulfilled queries in association with the application category exceeds the threshold number.

8. The computer-implemented method of claim 1, wherein the application feature includes one or more of application function, geographic location, product class, application sub-category, or merchant class.

9. The computer-implemented method of claim 1, wherein providing the application build recommendation includes identifying a plurality of developer accounts and sending a notification to each of the plurality of developer accounts regarding the application build recommendation.

10. A system having at least one user account and at least one developer account, the system comprising:

an online application database, the online application database storing applications;

a processor; and a memory storing gap assessment software containing computer-executable instructions that, when executed by the processor, are to cause the processor to:

identify at least one application search query from one of the user accounts as an unfulfilled query if the at least one application search query resulted in fewer than a predetermined number of relevant results;

store, in memory, a query string and metadata regarding the unfulfilled query;

determine that a count of stored unfulfilled queries exceeds a threshold number and, in response, identify at least one application feature based on query strings from the stored unfulfilled queries;

generate an application build recommendation specifying the at least one application feature; and provide the application build recommendation to the at least one developer account.

11. The system of claim 10, wherein the instructions, when executed are to cause the processor to identify the application search query by determining, for each application search query that resulted in a non-null list of relevant results, that a user account associated with that application search query did not access any applications include in the non-null list of relevant results.

12. The system of claim 10, wherein the metadata for each unfulfilled query includes, at least, an associated merchant identifier.

13. The system of claim 10, wherein the instructions, when executed are to cause the processor to identify at least one application feature by determining that more than a minimum percentage of the query strings contain a keyword, and wherein the at least one application feature includes the keyword.

14. The system of claim 13, wherein the instructions, when executed are to cause the processor to identify the at least one application feature by determining that the keyword corresponds to a type of application feature among a plurality of types of application features.

15. The system of claim 14, wherein the plurality of types of application features include one or more of geographic location, product class, application sub-category, merchant class, or application function.

16. The system of claim 10, wherein the instructions, when executed are to cause the processor to store the query string and metadata by determining an application category associated with the query string and metadata and storing the query string and metadata in associated with the application category, and wherein determining that a count of stored unfulfilled queries exceeds a threshold number includes determining that a count of stored unfulfilled queries in association with the application category exceeds the threshold number.

17. The system of claim 10, wherein the application feature includes one or more of application function, geographic location, product class, application sub-category, or merchant class.

18. The system of claim 10, wherein the instructions, when executed are to cause the processor to provide the application build recommendation by identifying a plurality of developer accounts and sending a notification to each of the plurality of developer accounts regarding the application build recommendation.

19. A non-transitory computer-readable medium storing processor-executable instructions for managing an online application database, the online application database storing applications and having at least one user account and at least one developer account, wherein the instructions, when executed by one or more processors, are to cause the one or more processors to:

identify at least one application search query from one of the user accounts as an unfulfilled query if the at least one application search query resulted in fewer than a predetermined number of relevant results;

store, in memory, a query string and metadata regarding the unfulfilled query;

determine that a count of stored unfulfilled queries exceeds a threshold number and, in response, identify at least one application feature based on query strings from the stored unfulfilled queries;

generate an application build recommendation specifying the at least one application feature; and provide the application build recommendation to the at least one developer account.

* * * * *